May 6, 1969

R. C. COMER 3,442,179

DOUBLE-ACTING EXPLOSIVE ACTUATOR

Filed Oct. 18, 1967

ROBERT C. COMER
INVENTOR

BY Ralph E. Bitner

ATTORNEY

United States Patent Office 3,442,179
Patented May 6, 1969

3,442,179
DOUBLE-ACTING EXPLOSIVE ACTUATOR
Robert C. Comer, Rockaway Borough, N.J., assignor to Astrosystems International, Inc., a corporation of New Jersey
Filed Oct. 18, 1967, Ser. No. 676,220
Int. Cl. F15b 11/08, 13/04; F01b 11/02
U.S. Cl. 91—420                                6 Claims

ABSTRACT OF THE DISCLOSURE

A double acting linear motor means is described for conversion of constant or explosive gas pressure into linear mechanical motion. The mechanism includes a piston within a hollow cylinder for actuation in either direction by a pressurized gas which may be the result of an explosion, the application of a gas produced by a thermal process, such as steam, or a gas under pressure which is stored in storage tanks and delivered to the actuator by means of controlled valves. One of the features of the actuator includes a cushioning means at the end of each stroke to prevent excessive impact on the cylinder head and to prevent damage to other mechanisms coupled to the actuator.

Background of the invention

Many actuators have been developed and used to transform gas under constant pressure into linear mechanical motion. Examples of these mechanisms are: pile drivers, air hammers, and many other types of control means which are used to operate mechanical punches, dies, and other pressure actuators. One of the disadvantages of prior art actuators is the lack of an adequate cushioning means for softening and absorbing the excess energy at the end of each stroke when this energy is of high order due to the adiabatic expansion of the supplied gases acting on the piston. Small instruments are not liable to damage under lack of cushioning means but the larger actuators, having higher speed and greater weight require some means for absorbing the impact of the moving mechanical piston and the attached mass. The present invention accomplishes this cushioning means by trapping a portion of the available pressure during each stroke and by using the excess energy to deform an expanding buffer ring. The amount of energy expended by the compressed gas to perform work is limited only to a slight degree by the trapped cushion of gas. The trapped gas cushion can be adjusted for absorbing only the normal excess energy.

The actuator mechanism includes one-way inlet valves for transmitting gas energy to the piston to do work. During this power stroke, compressed gas on the other side of the piston cushions the piston to avoid distructive end impact. The pressure of this cushion is regulated by another one-way valve acting against an adjustable spring. Other valves are included in the mechanism for relieving the pressure of the applied gas when compressed gas is admitted to the system to reverse the direction of the piston movement.

For a better understanding of the present invention, together with other details and features thereof, reference is made to the following description taken in connection with the accompanying drawings.

Description of the preferred embodiment

Figure 1:
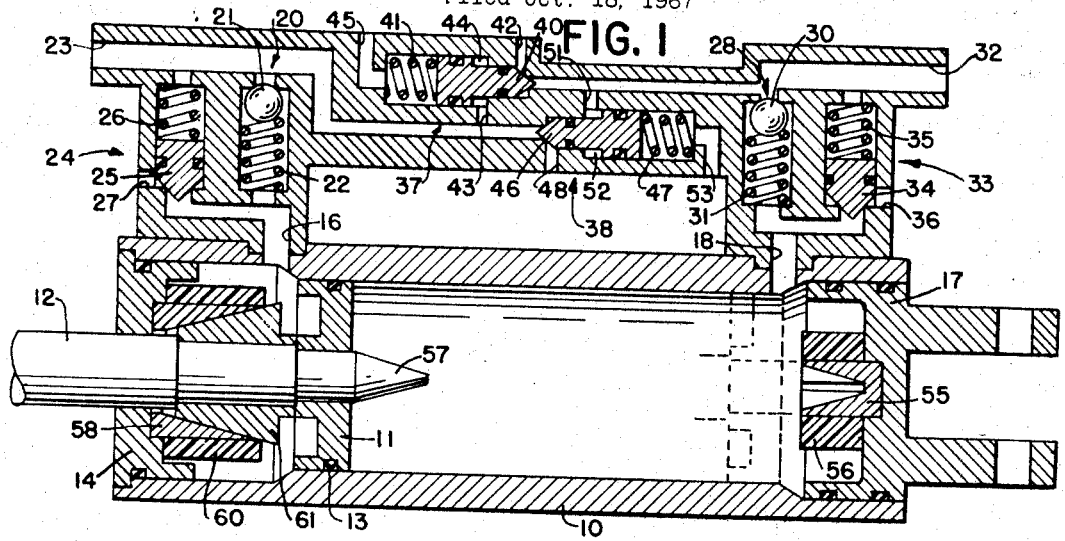
FIGURE 1 is a cross sectional view of the actuator with some of the valves shown in schematic position.

Referring now to the figures, the actuator is shown with a central cylindrical piston means 10 which supports a piston 11 secured to a shaft 12. The piston 11 may be provided with one or more piston rings 13 for providing a leakproof head. The shaft 12 passes through one head 14 of the hollow cylinder 10 and is connected mechanically to a load (not shown) to be moved. One portion of the head 14 assembly includes an inlet conduit 16 for forcing gas under pressure into the cylinder and also for releasing the gas after the initial stroke has been completed. The other head of the cylinder 17 is solid except for a conduit 18, similar to the conduit 16 at the other end.

Conduit 16 is connected to an inlet ball valve 20 including a ball 21 normally in contact with a valve seat and forced into a closed position by a helical spring 22. When compressed gas is forced through a first entrance conduit 23 the ball if pushed away from its seat and the compressed gas is admitted into cylinder 10 through conduit 16 to move the piston. A poppet valve 24 is also installed between conduits 23 and 16. This valve includes a poppet 25, held against a valve seat by a helical spring 26. The valve 24 is for passing gas in the reverse direction and when compressed gas is applied to entrance conduit 23 the poppet valve does not move. An exit opening 27 is connected to the poppet valve chamber so that gas can move from conduit 16 to the atmosphere when the valve is opened.

Similar valves are positioned at the other end of the cylinder. A second ball valve 28 includes a ball 30 and a helical spring 31 which normally presses the ball against its valve seat. Valve 28 is opened when gas under pressure is applied through a second entrance conduit 32 so that the gas passes into conduit 18 and cylinder 10 to move the piston in a reverse direction. A second poppet valve 33 includes a poppet 34 which is pressed against its valve seat by a helical spring 35. When valve 33 is opened by pressure from the inside of cylinder, gas from the cylinder 10 and conduit 18 can move through the valve to the atmosphere by way of opening 36.

On many occasions during the operation of this actuator, the pressure is raised in either entrance conduit and held at its raised condition for some time after the initial operation. Now, if it is desired to return the piston to its original position by the application of a similar gas pressure in the other conduit, it will be necessary to reduce the pressure in the first conduit before the piston can be returned. Two "bleeder" valves 37 and 38 are provided for this purpose. Valve 37 includes a poppet 40 resiliently urged by a helical spring 41 to normally retain the valve in a closed condition. The poppet 40 closes an exit from conduit 32 to an opening 42 to the atmosphere. A third opening 43 connects an annular space 44 with conduit 23. The rear end of the valve has a fourth opening 45 to the atmosphere.

A second bleeder or relief valve 38 includes similar components. It has a poppet 46, pressed by a spring 47 so that it normally closes an opening between the entrance conduit 23 and a conduit 48 to the atmosphere. A conduit 51 connects an annular space 52 to the other entrance conduit 32. As before, the rear end of the valve is connected to the atmosphere by opening 53.

Figure 2:
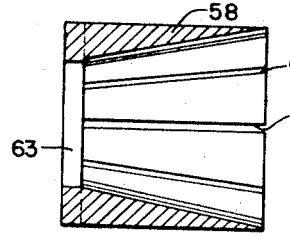
FIGURE 2 is a cross sectional view of one of the expanding cones used in conjunction with a resilient ring cushion. This view is taken along line 2—2 of FIGURE 3.
Figure 3:
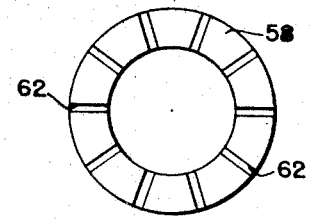
FIGURE 3 is an end view of the cone shown in FIGURE 2.

In order to provide additional mechanical cushioning to the piston and to retain the piston in its operated position, a small split cone 55 is mounted in axial alignment at one end of the cylinder as part of cylinder head 17. The split cone 55 is surrounded by a resilient coil 56 which may be made of wound glass fiber thread held together by a plastic composition. Other resilient materials may be used. A cone end 57 on shaft 12 fits into the cone cushion 55 and may push the split portions radially against the ring 56 at the end of the piston travel. A similar but larger split cone 58 is mounted in the other head 14 and is partly supported by a resilient ring 60. A large cone 61 is secured to shaft 12 and fits into the cone when in the position shown in FIGURE 1. FIGURES 2 and 3 show cone 58 in greater detail. The cone is split for the greater portion of its axial length by a number of cut out portions 62 so that these portions can expand to a slight degree against ring 60. The left hand portion 63 of the cone 58, which fits into a recess in cylinder head 14 is solid.

Figure 4:
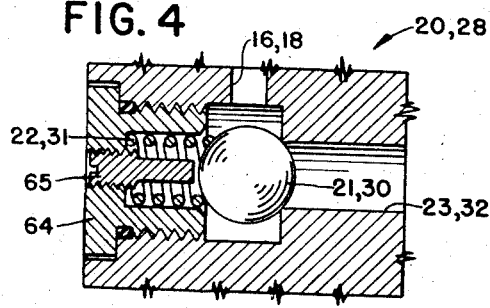
FIGURE 4 is a detailed cross sectional view, to an enlarged scale, of one of the ball one-way valves.
Figure 5:
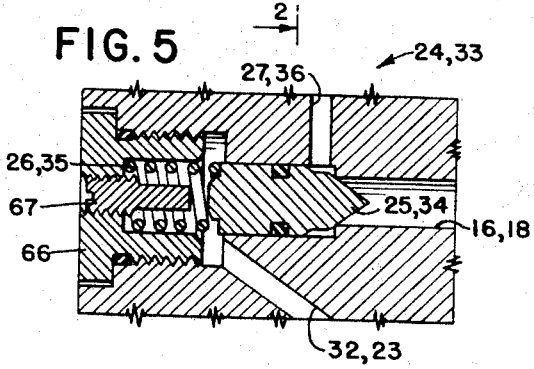
FIGURE 5 is a detailed cross sectional view of one of the poppet valves.
Figure 6:
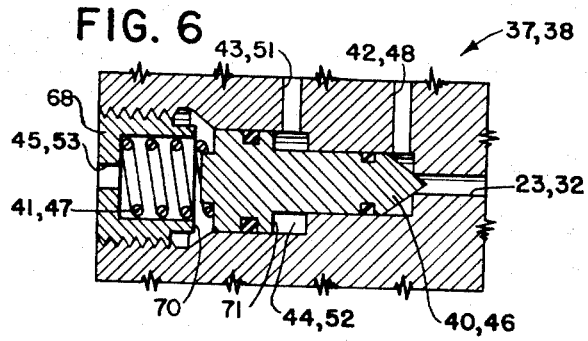
FIGURE 6 is a detailed cross sectional view of another poppet valve. This valve is subject to two compressive forces.

FIGURE 1 shows all six valves arranged in a single plane for convenient explanation of the operation. In actual practice these valves are positioned in a three dimensional array so that the spring ends of all valves are substantially flush with a side of the valve block so that the valves can be assembled easily and so that minor adjustments can be made. FIGURES 4, 5, and 6 show the actual details of these valves with additional adjustment means for limiting the valve motion.

FIGURE 4 is a cross sectional view of valves 20 and 28 having a ball 21, 30 held in place by a helical spring 22, 31. The spring is held in place by a hollow screw 64 and a central limit stop 65 is adjustably mounted in screw 64 to limit the movement of the ball.

FIGURE 5 is a cross sectional view of valves 24 and 33. This valve has three openings instead of two since there are times when a back pressure through conduit 32, 23 may prevent the valve from opening. This valve also has a hollow screw 66 for retaining the spring 26, 35 and an adjustable limit stop 67 which limits the movement of the poppet 25, 34. The operation of this valve will be explained later.

FIGURE 6 is a cross sectional view of valves 37, 38, used to adjust the flow of gas so that an adjustable cushion of air is provided near the end of travel of the piston 11. The valve spring 41, 47 is supported within the hollow portion of screw 68. The inside end portion 70 forms a limit stop to control the movement of the poppet. The main valve portion is the poppet cone 40, 46 which is normally pressed against a valve seat formed by the end of conduit 23, 32. When the valve opens, gas is permitted to flow from conduit 23, 32 into conduit 42, 48. A third conduit 43, 51 connects entrance conduits 23, 32 to an annular space 44, 52, and when gas pressure is applied to this space, the valve is opened because the annular surface 71 operates as a piston surface and forces the poppet to the left against the action of spring 41, 47. A fourth conduit 45, 53 connects the spring space with the atmosphere to reduce any pressure that might build up behind the poppet because of leakage. It should be noted that the cross sectional area of conduit 23, 32 is small and pressure within this space is never high enough to move the poppet against spring 41, 47. However, the annnular area of surface 71 is considerable and the pressure of the entrance conduit when applied to this section is enough to open the valve.

The operation of this actuator is as follows: with all the valves closed and the piston 11 at the left side of cylinder 11 as indicated in FIGURE 1, an explosive charge is applied to entrance conduit 23. High pressure gas passes through ball valve 20 and conduit 16 to act on piston 11 to move it to the right. Valve 24 cannot open at this time because the pressure at the rear of poppet 25 is always somewhat greater than the pressure in conduit 16. Pressure is also applied to the poppet in valve 38 but the pressure area is small and spring 47 is strong enough to keep the valve closed during this portion of the cycle. Pressure is also applied to the annular space 44 in poppet valve 37 by way of conduit 43 and, because this area (71, see FIGURE 6) is much greater than the exposed area around the poppet point, the valve opens to permit any compressed gas in conduit 32 to escape to the atmosphere through opening 42.

If the application of compressed gas to conduit 23 is the start of a sequence of actuator strokes or if it is a single application, there will be no pressure in conduit 32 and the open of valve 37 performs no function at this time. As the piston 11 moves to the right, it compresses the gas in front of it and forces some of it into conduit 18. This gas forms a resilient cushion as the pressure builds up, preventing a hard and damaging impact against cylinder head 17. When the pressure reaches a limiting value, poppet valve 33 opens, and compressed gas moves from conduit 18, past poppet 34 into opening 36 and the atmosphere. Details of valve 33 are shown in FIGURE 5 and it is obvious that the travel of poppet 34 can be adjusted by limit rod 67 provide a gas cushion of variable strength. At the end of the piston travel, the cone 57 is forced into the receptacle 55, spreading the splined fingers 58 and expanding ring 56 a small amount. The end position of the piston is shown by dotted lines adjoining ring 56. The angle of cone 57 is made sharp enough so that the cone remains in receptacle 55 until forced away by the next action of compressed gas in conduit 32.

The return stroke of piston 11 is similar to the action described above except that there may be considerable gas pressure remaining in the left side of the piston and in the entrance conduit 23. This pressure is reduced by the application of the pressurized gas in conduit 32 which is also applied through conduit 51 to the annular space 52 to force the poppet 46 to the right and permit the compressed gas in conduit 23 to move through the valve 36 and into opening 48 and the atmosphere. This action reduces the pressure on the back side of valve 24 so that the gas behind the piston 11 can then open the valve and move through conduits 16 and 27 to the atmosphere. As before, the residual gas behind the piston 11 forms a resilient cushion and retards the return stroke enough to prevent damage to cylinder head 14. As before, the helical spring 26 forces poppet valve 25 against its seat to regulate the cushion to a desired pressure value. At the end of the second actuation of piston 11, the piston limits against the expandable cone 58 cushioned by ring 60 and the cycle of operations is complete.

The actuator, as described above, is designed to operate loads which require more than the usual force produced by compressed air actuators. The valve system is designed to protect the operating piston and the load from damage by severe changes in velocity.

The foregoing disclosure and drawings are merely illustrative of the principles of the invention and are not to be interpreted in a limiting sense. The only limitations are to be determined from the scope of the appended claims.

I claim:

1. A double-acting actuator for transforming the energy of compressed gas into mechanical motion comprising; a hollow cylinder closed at both ends by cylinder heads, a piston within the cylinder connected to a shaft for moving along the cylinder axis and for operating an external load coupled to the shaft, an entrance conduit at each end of the cylinder where compressed gas may be entered to move the piston, a pair of entrance valves each connected to an entrance conduit for admitting compressed gas to the cylinder but blocking its escape, a first pair of relief valves connected between the cylinder ends and the atmosphere for retaining gas in the cylinder at a desired reduced pressure to form a cushion when the piston is being moved toward the valve, and a second pair of relief valves for connecting an entrance conduit to the atmosphere when the other entrance conduit receives compressed gas, each of said second relief valves including a closure means which opens and closes a connection between an entrance conduit and the atmosphere and a valve surface adjoining a space connected to the other entrance conduit for moving the valve against a resilient means.

2. An actuator as claimed in claim 1 wherein each of said entrance valves includes a closure means.

3. An actuator as claimed in claim 1 wherein each of said first pair of relief valves includes a movable valve component supported by a resilient means, one side of the valve connected to an end of the cylinder and the other side of the valve connected to the atmosphere, the spring end of the movable valve component connected to one of the entrance conduits.

4. An actuator as claimed in claim 1 wherein each of said second relief valves includes a connection to the spring end of the closure means.

5. An actuator as claimed in claim 1 wherein each side of the piston is secured to a male cone extension for cushioning the impact of the piston as it strikes either cylinder head, and a female cone receiver secured to each cylinder for receiving a male cone, said female cones each having a plurality of slots cut in the cone material in a longitudinal direction for permitting expansion of the female cones when engaged by a male cone.

6. An actuator as claimed in claim 5 wherein each of said female cones is surrounded by a resilient ring for absorbing the impact of the cones.

References Cited
UNITED STATES PATENTS

| | | | |
|---|---|---|---|
| 3,030,930 | 4/1962 | Gratzmuller | 91—45 X |
| 3,060,688 | 10/1962 | Gondek | 91—420 |
| 3,145,734 | 8/1964 | Lee et al. | 91—420 |

PAUL E. MASLOUSKY, *Primary Examiner.*

U.S. Cl. X.R.

91—452, 454, 462; 92—85